Nov. 27, 1923.  
M. J. HARLAN  
DEVICE FOR FORMING CHOCOLATES  
Filed Jan. 19, 1922
1,475,579
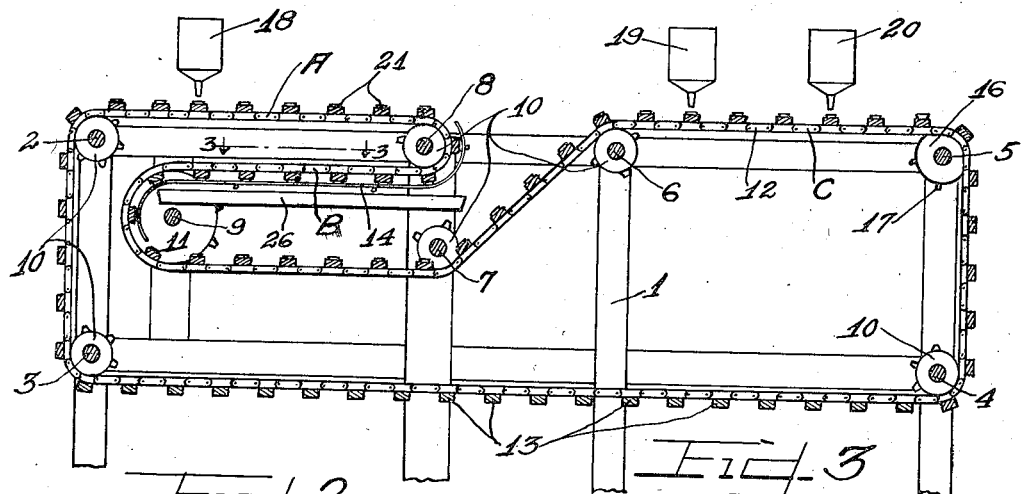
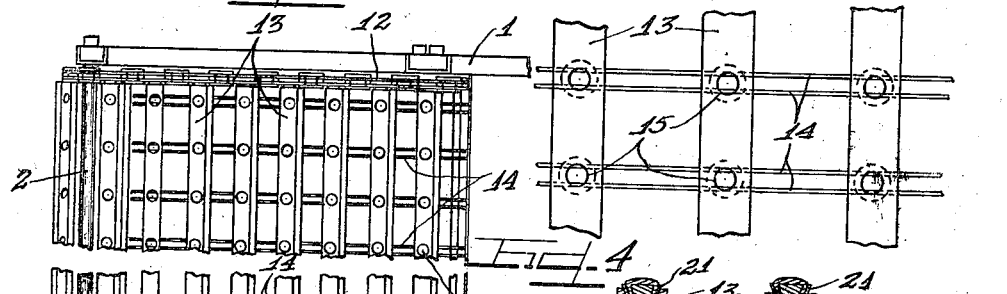
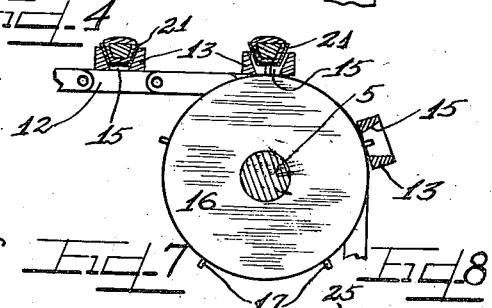
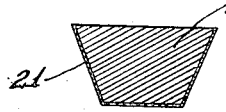
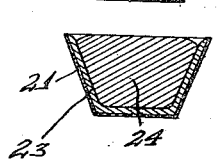
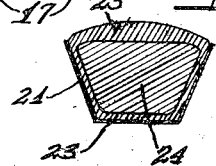
WITNESSES
Rudolph T. Berg
Carlson Hill
INVENTOR
MILTON J. HARLAN.

Patented Nov. 27, 1923.

1,475,579

UNITED STATES PATENT OFFICE.

MILTON J. HARLAN, OF CHICAGO, ILLINOIS.

DEVICE FOR FORMING CHOCOLATES.

Application filed January 19, 1922. Serial No. 530,248.

*To all whom it may concern:*

Be it known that I, MILTON J. HARLAN, a citizen of the United States, and a resident of the city of Chicago, in the county of Cook and State of Illinois, have invented certain new and useful Improvements in a Device for Forming Chocolates; and I do hereby declare that the following is a full, clear, and exact description of the same, reference being had to the accompanying drawings, and to the numerals of reference marked thereon, which form a part of this specification.

This invention relates more particularly to an improved process of mechanically forming filled chocolates in containers entirely obviating any physical handling of the chocolates except by means of the containers in which the chocolates are formed.

It is an object of this invention to provide a process of forming filled chocolates without requiring the manual handling thereof.

It is also an object of the invention to provide a sanitary method of forming filled chocolates in cups or containers.

Another object of the invention is to form a filled chocolate by first filling a container with chocolate, then inverting the filled container to permit most of the chocolate to drain therefrom leaving a chocolate coating within the container, after which the lined container is again turned upright and conveyed along to be filled with a filling or fondant and then covered with a chocolate top.

It is an important object of this invention to provide a sanitary process of forming filled chocolates in containers by first forming a shell within a container by filling the same with chocolate and then inverting the container to form a lining therein, after which the lined container is again righted and a filler deposited therein and covered with a top after which the finished chocolates together with the containers are ejected from a conveyor to permit the chocolates to be removed by lifting the same by means of the containers.

Other and further important objects of this invention will be apparent from the disclosures in the drawings and specification.

The invention (in a preferred form) is illustrated on the drawings and hereinafter more fully described.

On the drawings:

Figure 1 is a fragmentary side elevation of a machine for accomplishing the sanitary process of forming filled chocolates without touching the chocolates.

Figure 2 is a fragmentary top plan view of one end of the machine.

Figure 3 is an enlarged fragmentary detail view taken on line 3—3 of Figure 1 showing the wires for retaining the inverted containers in position to permit the same to be partially drained.

Figure 4 is a fragmentary vertical section at the discharge end of the conveyor illustrating the ejecting means.

Figure 5 is a cross-section of the filled container forming the first step in the process.

Figure 6 is a cross-section of the second step of the process illustrating a container inverted after filling to cause a shell to remain therein.

Figure 7 is a cross-section of the upright container and shell after filling.

Figure 8 is a cross-section of the finished covered chocolate.

As shown on the drawings:

The reference numeral 1 indicates a machine frame having rotatably supported thereon a plurality of transverse shafts 2, 3, 4, 5, 6, 7, 8 and 9, and adapted to be driven from any suitable source of power. Mounted near the ends of each of the shafts 2 to 8 inclusive are sprocket wheels 10. Larger sprocket wheels 11 are mounted near the ends of the shaft 9. Trained around the sprocket wheels 10 and 11 in the manner illustrated in Figure 1 is an endless conveyor comprising endless chains 12 connected by cross slats or bars 13.

The conveyor runs rearwardly from the shaft 2 through a horizontal loading position A to the shaft 8 where the conveyor turns downwardly and runs inverted toward the loading end of the machine as at B. The conveyor then travels downwardly around the large sprocket wheels 11 and then passes rearwardly and upwardly through the horizontal filling and finishing position C between the shafts 6 and 5.

Mounted on the frame 1 below the conveyor position B is a retaining screen made up of a plurality of pairs of wires 14 which extend longitudinally of the conveyor and follow the contour thereof for a short distance where the conveyor curves around the shafts 8 and 9.

Each of the conveyor bars 13 is provided with a plurality of spaced conical cup holding openings or pockets 15. Mounted on the shaft 5 are a plurality of disks or plates 16 spaced to correspond with the spacing of the pockets 15 in the bars 13. Each disk has a plurality of radial ejecting pins or fingers 17 projecting from the periphery thereof spaced to project into the pockets of the conveyor bars 13 as shown in Figure 4.

Supported in any suitable manner above the conveyor position A is a transverse row of chocolate dispensing tanks or fillers 18 having the discharge nozzles thereof spaced to register with the pockets 15 in the conveyor bars 13. Mounted above the conveyor position C is a transverse row of filling or fondant dispensing tanks or fillers 19 and a row of chocolate dispensing tanks or fillers 20.

Referring to Figures 5 to 8 inclusive, each chocolate is formed in a cup or container 21 made of waxed paper or other suitable material and as illustrated of frustum shape although not necessarily so. The cup 21 is first filled with a soft chocolate filling 22 after which the cup is inverted permitting the greater part of the filling 22 to drain from the cup, leaving only a chocolate shell or coating 23. A filling or fondant 24 is next deposited in the shell 23 after which chocolate is deposited upon the top of the filling 24 to form a cover or top 25 which together with the shell 23 forms the outer chocolate housing or coating for the enclosed filling or fondant 24.

The operation is as follows:

The endless conveyor is adapted to be run from any suitable source of power and follows the distorted path illustrated in Figure 1. The filling tanks or cans 18, 19 and 20 are provided with discharge nozzles and are mounted by any suitable means above the frame 1 and above the positions A and C of the upper lap of the conveyor. As the apertured bars 13 move upwardly around the shaft 2 into horizontal position, an operator places or seats a paper cup in each pocket 15 of each bar. The bar carrying a row of cups is thus moved along into a position directly below the nozzles of the filler tanks 18. A predetermined quantity of soft chocolate 22 is deposited from the tanks 18 into the respective cups 21 therebelow, after which the filled cups are advanced through the position A to allow the chocolate adjacent the inner surface of the cups to set and adhere to the cups. As the bars carrying the filled cups round the shaft 8, the edges of the cups come into contact with the retaining wires 14 which act to hold the cups in an inverted position through the position B during which time the chocolate filling 22 is permitted to flow into a drip pan 26. The chocolate adjacent the inner surfaces of the cups adheres thereto forming the shells or the coatings 23. As the conveyor carries the partially filled cup back into an upright position, the chocolate shells 23 are permitted to set as they approach position C. The successive rows of partially filled cups are next moved underneath the row of filling tanks or cans 19 which when opened deposit a predetermined quantity of fondant or filling 24 into the shells 23. The filled cups and shells are next conveyed beneath the filling tanks or cans 20 which when opened deposit a predetermined quantity of chocolate upon the top of the fillings 24 to form covers or tops 25 which together with the shells form complete chocolate coatings for the fillings 24. As the completed chocolates approach the end of the position C, the ejecting pins 17 on the disks 16 move into the bar openings or pockets 15 and act to thrust or elevate the cups containing the completely formed chocolates into a position permitting an operator to pick the cups out of the bar pockets by means of the containers without touching the formed chocolates.

It will be noted that this invention covers an improved method or process for automatically forming filled chocolates in cups or retainers without requiring personal handling of any parts of the confection proper during the entire process of forming the chocolates or after the chocolates have been completely formed. The cups or containers holding the chocolates serve as protecting guards for the chocolates and permit the chocolates to be removed from the machines and packed.

It will of course be understood that bonbons or other similar confections may be formed by the process hereinbefore described as well as filled chocolates or fancy candy puddings. The finished products turned out by this improved sanitary process are of uniform size, shape and weight which may be varied depending upon the shape and size of the cups and the adjustment of the filler tanks to regulate the amount of chocolate and filling materials to be discharged at a single operation.

The improved process is extremely sanitary and is simple in execution merely consisting in the filling of a traveling cup, inverting the filled cup to permit parts of the contents to flow therefrom to leave a coating of the same within the cup, after which the cup with its coating is again turned upright and filled with a filling or fondant after which a top is deposited over the filling or fondant to form the completed confection.

I am aware that numerous details of construction may be varied through a wide range without departing from the principles of this invention, and I therefore do not purpose limiting the patent granted otherwise than necessitated by the prior art.

I claim as my invention:

1. A device for mechanically forming filled confections comprising an endless conveyor, guide members therefor to cause the upper lap of the conveyor to travel first in an upright position, then in an inverted position and then back into upright position, bars on said conveyor having pockets therein for carrying paper cups, feed tanks mounted above the upright portions of said conveyor to permit successive filling of the cups, and retaining screens on which the cups slide for retaining the cups in position during the time they are traveling in an inverted position.

2. A device for mechanically forming filled confections in cups, said device comprising an endless conveyor, means for driving the same, bars forming a part of said conveyor having pockets therein for carrying cups in which the confections are to be sold, guide members for causing the upper lap of the conveyor to travel first in a horizontal upright position, then in a horizontal inverted position and then back into a horizontal upright position, feed tanks mounted above the upright portions of the upper lap of said conveyor to permit successive fillings of the cups carried by the conveyor bars, retaining screens mounted below the inverted portion of the conveyor for supporting and holding the cups in position during the time they are traveling in an inverted position, a drip pan beneath the retaining screens for receiving material discharged from the inverted cups, and ejecting mechanisms at the end of the upper lap of the conveyor for pushing the filled cups out of the bar pockets.

In testimony whereof I have hereunto subscribed my name in the presence of two subscribing witnesses.

MILTON J. HARLAN.

Witnesses:
CARLSON HILL,
FRED E. PAESLER.